(12) United States Patent
Kay et al.

(10) Patent No.: US 7,065,415 B2
(45) Date of Patent: Jun. 20, 2006

(54) METHOD FOR CONSISTENT STORAGE OF DATA IN AN INDUSTRIAL CONTROLLER

(75) Inventors: James J Kay, Chardon, OH (US); David Allen Johnston, Mentor, OH (US); Shelly Lynn Urdaneta, Lyndhurst, OH (US); Stuart Blair Siegel, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/924,230

(22) Filed: Aug. 23, 2004

(65) Prior Publication Data

US 2005/0021156 A1    Jan. 27, 2005

Related U.S. Application Data

(62) Division of application No. 09/918,177, filed on Jul. 30, 2001, now Pat. No. 6,801,813.

(51) Int. Cl.
*G05B 19/42* (2006.01)

(52) U.S. Cl. .............................. 700/87; 700/18; 700/86; 700/88; 700/23; 700/181; 700/253; 700/250; 717/110; 717/168; 717/174

(58) Field of Classification Search .................. 700/17, 700/18.2, 23, 86, 87, 88, 180, 181, 250, 253, 700/257; 901/3, 4, 5; 417/110, 168, 174
See application file for complete search history.

(56) References Cited

U.S. PATENT DOCUMENTS

| | | | | |
|---|---|---|---|---|
| 5,005,152 | A | * | 4/1991 | Knutsen ..................... 717/139 |
| 5,276,811 | A | * | 1/1994 | Zifferer et al. ............... 703/25 |
| 5,295,059 | A | * | 3/1994 | Brooks et al. ................ 700/18 |
| 5,319,783 | A | * | 6/1994 | Zink et al. .................... 700/18 |
| 5,428,526 | A | * | 6/1995 | Flood et al. ................... 700/12 |
| 5,485,620 | A | * | 1/1996 | Sadre et al. ................. 717/162 |
| 5,504,902 | A | * | 4/1996 | McGrath et al. ............ 717/146 |
| 5,576,946 | A | * | 11/1996 | Bender et al. ............... 700/17 |
| 6,505,341 | B1 | * | 1/2003 | Harris et al. ................ 717/100 |
| 6,580,953 | B1 | * | 6/2003 | Wiebe et al. ................. 700/86 |

* cited by examiner

*Primary Examiner*—Ramesh Patel
(74) *Attorney, Agent, or Firm*—Amin & Turocy, LLP; R. Scott Speroff

(57) ABSTRACT

A system and method for employing a file system and file system services on the industrial controller. The file system allows industrial control programs to implement many functions previously performed within the industrial control program and stored in the same memory as the industrial control program. An execution engine is provided that interprets instructions included in an industrial control program. The instructions utilize services in the file system for including user defined routine files loaded from local or remote locations, to load and unload recipe files from local and remote locations, to log and retrieve measured data and trend data to files at local or remote locations, to select different operating systems and to select a running program from a plurality of running programs utilizing the file system.

20 Claims, 8 Drawing Sheets

METHOD FOR CONSISTENT STORAGE OF DATA IN AN INDUSTRIAL CONTROLLER

RELATED APPLICATIONS

This application is a divisional application of U.S. Ser. No. 09/918,177, filed on Jul. 30, 2001, now U.S. Pat. No. 6,801,813 entitled "METHOD FOR CONSISTENT STORAGE OF DATA IN AN INDUSTRIAL CONTROLLER," the entirety of which is incorporated herein by reference.

TECHNICAL FIELD

The present invention generally relates to industrial control systems and in particular to providing a file system on an industrial controller and a system and methods for employing the file system.

BACKGROUND OF THE INVENTION

Industrial controllers are special purpose computers used for controlling factory automation devices. Under the direction of a stored program, a processor of the industrial controller examines a series of inputs reflecting the status of a controlled process or device and changes outputs affecting control of the controlled process or device. Generally industrial controllers are constructed in modular fashion to accommodate different applications requiring different numbers and types of input/output (I/O) circuits as is determined by the particular device or process being controlled. The stored control program runs in real-time to provide outputs to the controlled process as electrical signals to outputs such as actuators and the like. The outputs are based on the logic of the control program and inputs received from sensors of the controlled process.

The industrial controller or programmed logic controller (PLC) executes a series of operations that are performed sequentially and repeatedly. In general, the series of operations includes an input scan, a program scan and an output scan. During the input scan the PLC examines the on or off state of the external inputs and saves these states temporarily in memory (e.g., a file). During the program scan the PLC scans the instruction of the program and uses the input status to determine if an output will be energized. The output results are then saved to memory (e.g., a file). During the output scan the controller will energize or de-energize the outputs based on the output results stored in memory to control the external devices.

A conventional language for programming the stored program is relay ladder logic. Each ladder logic program comprises one or more ladder logic statements, referred to as rungs or instructions. The ladder logic statements define relationships between an output variable and one or more input variables. Input variables are variables that correspond to signals at input terminals and output variables are variables that correspond to signals at output terminals. In relay ladder logic, the input and output signals may be represented graphically as contact symbols and coil symbols arranged in a series of rungs spanning a pair of vertical power rails. A typical ladder logic statement may indicate that a specific output variable is "on" if and only if a first and a second input is "on".

The ladder logic program not only manipulates single-bit input and output data representing the state of the sensing and operating devices, but also performs arithmetic operations, timing and counting functions and more complex processing operations. A ladder program can be created by connecting a special input module to a PLC that includes a small keyboard and entering ladder logic statements directly into the memory of the PLC. Another method of creating a ladder logic program involves, utilizing a ladder logic program development/editor tool residing on a separate device, such as a personal computer. An operator or programmer of the personal computer draws a series of ladder logic graphs representing each rung or instruction directly on the computer display screen. Once the ladder logic program is complete, the PC software converts the graphs into the corresponding ladder logic commands. The ladder logic command are then transferred to the PLC and stored in the PLC memory.

A PLC and/or a personal computer device can store one or more ladder logic programs and versions. However, a user must manually upload and download ladder logic programs at a work station or personal computer running a developer/editor application program. The current program running on the industrial controller can only be selected and/or changed by the editor. Data backup, storage and trend data is invoked through an application program and stored on a RAM residing on the industrial controller. The size of the RAM is limited and can eventually overload. An operator must periodically upload the data to remove it from the industrial controller memory to avoid overloading. Additionally, a program may include different profiles (e.g., different recipes) and associated parameters regarding particular implementations of a process. Conventionally, these different profiles are stored in huge dimensional arrays within the application program utilizing the memory of the industrial controller.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides a system and method for providing a file system on an industrial controller. The file system allows industrial control programs to implement many functions previously performed within the industrial control program and stored in the same memory as the industrial control program. An execution engine is adapted to interpret new instructions that invoke the services of the file system. An editor is also provided that allows a user to include instructions interpretable by the execution engine employing services of the file system. The execution engine, the file system and the running industrial control program (e.g., ladder logic program) provide the functionality for loading user defined routine files at run-time from any file location, such as a memory device residing on the industrial controller, on a local server or at a remote location. Additionally, recipe files can be loaded and unloaded at real-time. A recipe file is a profile and the associated parameters regarding a particular implementation of a process (e.g., different paint types, different cookie types). The recipe files can reside on a memory device residing on the industrial controller, on a local server or at a remote location.

The execution engine also interprets instructions in the running industrial control program for logging measured data and trend data to a file at a memory device residing on the industrial controller, on a local server or at a remote location automation using the file system services. The file system services can also be employed to retrieve the measured data and trend data. The file system services allow selection of a running program from a plurality of application programs residing on the industrial controller. The selection can be invoked by sending a communication command from a remote or local location. Additionally, one or more operating systems can be provided in one or more files and a particular operating system selected to execute on the industrial controller corresponding to the development of the running industrial control program. The operating system can be stored as a file along with the industrial control program or the user defined routines. Multiple versions of the operating system can be stored to provide a "dual boot" situation The following description and the annexed drawings set forth in detail certain illustrative aspects of the invention. These aspects are indicative, however, of but a few of the various ways in which the principles of the invention may be employed. Other advantages and novel features of the invention will become apparent from the following detailed description of the invention when considered in conjunction with the drawings.

DETAILED DESCRIPTION OF THE INVENTION

The present invention will now be described with reference to the drawings. The present invention will be described with reference to a system and method for employing a file system and file system services on an industrial controller. An execution engine is provided that interprets instructions included in an industrial control program. The instructions utilize services in the file system for including user defined routine files loaded from local or remote locations, to load and unload recipe files from local and remote locations, to log and retrieve measured data and trend data to files at local or remote locations, to select different operating systems and to select a running program from a plurality of running programs utilizing the file system. It is to be appreciated that a number of other functions and services can be employed utilizing the services of the file system in accordance with the present invention. Although the present examples will be illustrated with respect to an implementation using ladder logic programs, other industrial control programming languages can be employed and still fall within the scope of the present invention and appended claims.

The present invention provides a system for multiple files on a single device. The file system provides a common interface for all non-volatile storage devices, such as CompactFlash cards, Windows CE platforms and hard drives that access the file system through a set of common services, such as Get File Information, Read File, Write File, Create File, Delete File, Open File, Close File, etc. The present invention provides for multiple types of data to be stored such as user programs, data logging, recipe storage, operating system updates and program transfers. The present invention supports lean manufacturing by allowing quick reconfiguring of manufacturing environments, allowing user's to load a specific application into the controller "on demand" without downloading from programming software and allows user's to purchase smaller memory processors.

Figure 1:
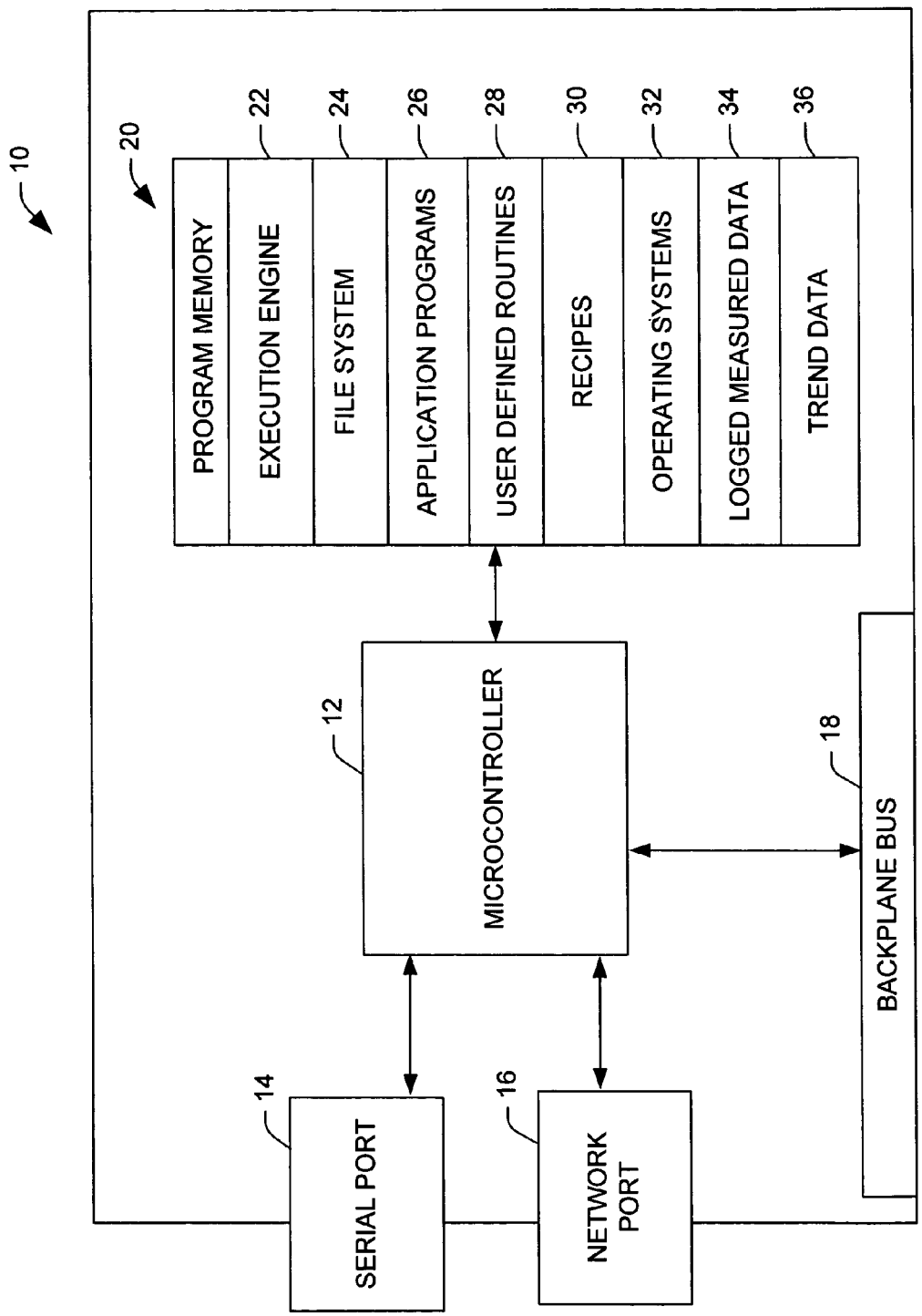
FIG. 1 illustrates a block schematic diagram of an industrial controller employing a file system in accordance with one aspect of the present invention.

FIG. 1 illustrates an industrial controller 10 having a file system 24 stored in a program memory 20. The file system 24 can be accessed through a set of common file services. For example, the set of common file services can include services such as Get File Information, Read File, Write File, Create File, Delete File, Open File, Close File, etc. The file system 24 can include a file manager that includes functions for managing the files, such as moving, deleting and copying files. An application program residing on the industrial controller can utilize the file system to perform a variety of functions previously performed within the application program or through an editor. The industrial controller 10 includes a serial port 14 and a network port 16 both coupled to a microcontroller 12. The serial port 14 and network port 16 provides a communication link to remote devices. The microcontroller 12 is also coupled to a backplane bus 18 for providing instructions and receiving inputs from I/O modules. The program memory 20 provides the microcontroller 12 with the execution code necessary to communicate to other devices through the serial port 14, the network port 16 and the backplane bus 18. The program memory also includes the algorithms and calculations necessary for the particular process that the industrial controller is controlling.

The program memory 20 includes an execution engine 22 that performs the main initialization routines of the industrial controller 10 and other devices that the industrial controller 10 communicates with and controls. The execution engine 22 is also the main interface to remote devices. The execution engine in cooperation with a file system 24 allows remote devices to select a particular application program to execute from amongst a plurality of application programs 26. The execution engine 22 is adapted to interpret instructions supplied by the application program including instructions that perform access to one or more files services in the file system 24. Typically, these instructions are written by an editor in ladder logic, which is then converted to programmable logic controller (PLC) instruction code.

The application programs 26 can employ the file system 24 to perform a variety of functions previously performed within the application programs. For example, one or more user defined routine files 28 can be loaded or linked at runtime by including a file system service command within the application program. The user defined routine files 28 can be one or more libraries, such as a math library or a communication library. Additionally, one or more recipe files 30 can be loaded through the application program employing a file system service. A recipe file is a profile and associated parameters regarding a particular implementation or process. For example, one recipe can be for mixing ingredients for a certain type of paint (e.g., water based paint), while another recipe can be for a different type of paint (e.g., oil based paint). Different recipes can be loaded upon a change in one or more parameters during execution of the application program. Using new instructions, recipes can be loaded and recorded to and from non-volatile memory as a file. A new recipe can be loaded into the same memory space as the previous recipe to save RAM space. Since the user defined routine files 28 and the recipe files 30 are stored in separate files from the application program, the user defined routine files 28 and the recipe files 30 can be stored in a different memory device than the executing application program. The different memory device or devices can reside on the controller 10 or on a remote device, thus reducing the size of the memory that needs to reside on the controller 10. The execution engine 22 is adapted to load the user define routine files and the recipe files upon receipt of a proper instruction from an executing application program.

The program memory 20 can also include one or more operating system files 32. For example, one application may be developed on a first operating system platform and another application program may be developed on a second operating system platform. The different application programs may not operate correctly or optimally on different operating system platforms. The basic services of the operating system is provided in one or more files. Therefore, when an application program is saved, a copy of the operating system can be saved along with the application program. The operating system and application program can be loaded together when moving an application program from one industrial controller to another to assure compatibility of the operating system and the executing application program running on the controller. The execution engine 22 or the application program can invoke the proper operating system for execution of the application program. The different operating system files 32 can reside on a separate memory device from the application programs at a local or remote location with respect to the industrial controller 10.

Another function that application programs perform utilizing services of the file system 24 is data logging and data retrieval. For example, logged measured data 34 and trend data 36 each can be logged in one or more files. Logged measure data can include continuous temperature measurements that were conventionally stored in the same RAM that the application program was executing. Trend data includes monitoring differences (e.g., temperature differences) over time. Eventually, the capacity of the RAM is reached and no new temperature data can be stored in the RAM. However, the present invention eliminates this problem by storing the temperature data to a file that can be located on another memory device at a local or remote location. The one or more files can be stored in a separate memory device from the memory on which the application program executes. The separate memory device can reside at a remote location, such that data can be stored at one or more locations over a network. The data can also be accessed by the application program through the file system services 24. The execution engine 22 interprets the appropriate logging and retrieval instruction from the application program and calls one or more functions within the file system 24 to perform the requested data logging and retrieval.

Figure 2:
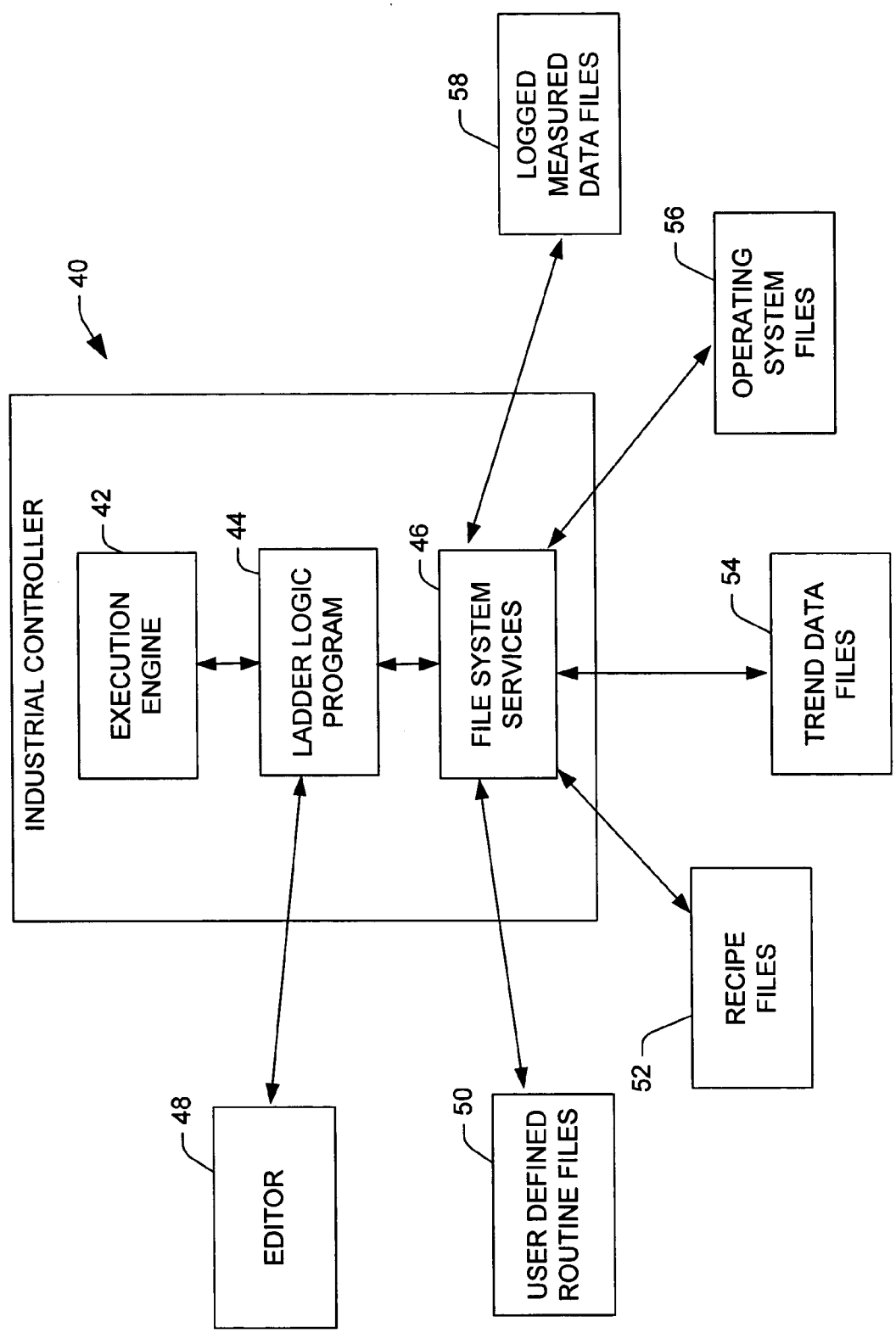
FIG. 2 illustrates a block diagram of an industrial controller employing a file system to access files remote from the industrial controller in accordance with one aspect of the present invention.

Referring to FIG. 2, an industrial controller 40 includes an execution engine 42, a ladder logic program 44 and a plurality of file system services 46. The execution engine 42 is adapted to interpret instructions within the ladder logic program 44 including instructions that perform access to one or more files system services 46. The ladder logic program 44 uses one or more services to access user defined routine files 50, recipe files 52 and operating system files 56. The ladder logic program 44 also employs one or more file system services 46 to log and access trend data files 54 and measured data files 58. The ladder logic program 44 and the file system services 46 reside and execute on a random access memory (RAM) residing on the industrial controller 40. The user defined routine files 50, the recipe files 52 and the operating system files 56 reside at a separate memory location from the RAM of the industrial controller 40. The ladder logic file 44 employs the file system services 46 to load one or more user defined routine files 50, a particular recipe file 52 having parameters associated with the particular implementation of the process to be performed and an operating system file 56 if the application program was developed under a different operating system that the one currently being used. The one or more loaded user defined routine files 50, the particular loaded recipe file 52 and the loaded operating system file 56 are then loaded into the RAM for execution. During execution of the ladder logic program 44, measured data and trend data can be stored in one or more measured data files 58 and one or more trend data files 54.

An editor 48 is provided that allows a user to develop, load, unload, edit or delete one or more ladder logic programs to the industrial controller 40. The editor 48 is adapted to allow a user to insert and edit instructions for employing one or more file system services 46. The editor 48 includes instructions for including one or more user defined routine files 50, for including an operating system file from amongst one or more operating system files 56 and for including one or more recipe files 52 in the ladder logic program 44. The editor 48 is also adapted to allow a user to insert and edit instructions for logging and retrieval of measurement data 58 and trend data 54 in the ladder logic instructions. The editor 48 can then convert the instructions in the ladder logic into instructions understandable and executable by the execution engine 42. Optionally, an operating system file corresponding to development of the ladder logic program can be saved along with the ladder logic program and loaded onto the industrial controller 40 to assure the executing program and the operating system of the industrial controller are compatible.

Figure 3:
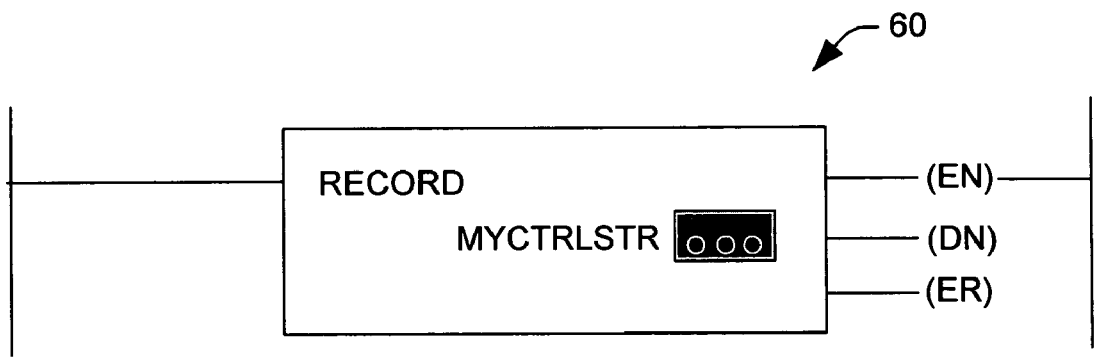
FIG. 3 illustrates an example of a record instruction for implementing into a ladder logic program in accordance with one aspect of the present invention.
Figure 4:
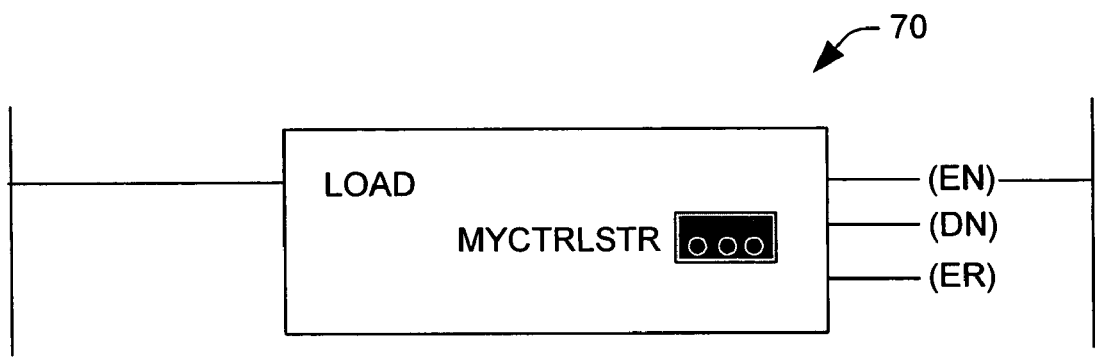
FIG. 4 illustrates an example of a load instruction for implementing into a ladder logic program in accordance with one aspect of the present invention.

As stated above, an editor is provided with a plurality of available instructions for utilizing the file system in accordance with the present invention. FIG. 3 illustrates an example of a ladder data record instruction 60 in accordance with an aspect of the present invention. The ladder data record instruction 60 can be inserted into a ladder logic program during program development. On a rung transition, the record instruction can open a connection to a target storage file manager object and file and append the specified data record to the data already in the file. The variables associated with the record instruction include a pointer to the data to send, the size of the data, the path to the file manager or managers, which file manager and the specific file to append the specified data record. FIG. 4 illustrates a ladder data load instruction 70 in accordance with an aspect of the present invention. The ladder data load instruction 70 can be inserted into a ladder logic program during program development. On a rung transition, the load instruction can open a connection to a target storage file manager object and file and load the specified data record to the specified location. The variables associated with the record instruction include a pointer to the location to fill, the size of the data, the path to the file manager or managers, which file manager and the specific file containing the specified data record.

Figure 5:
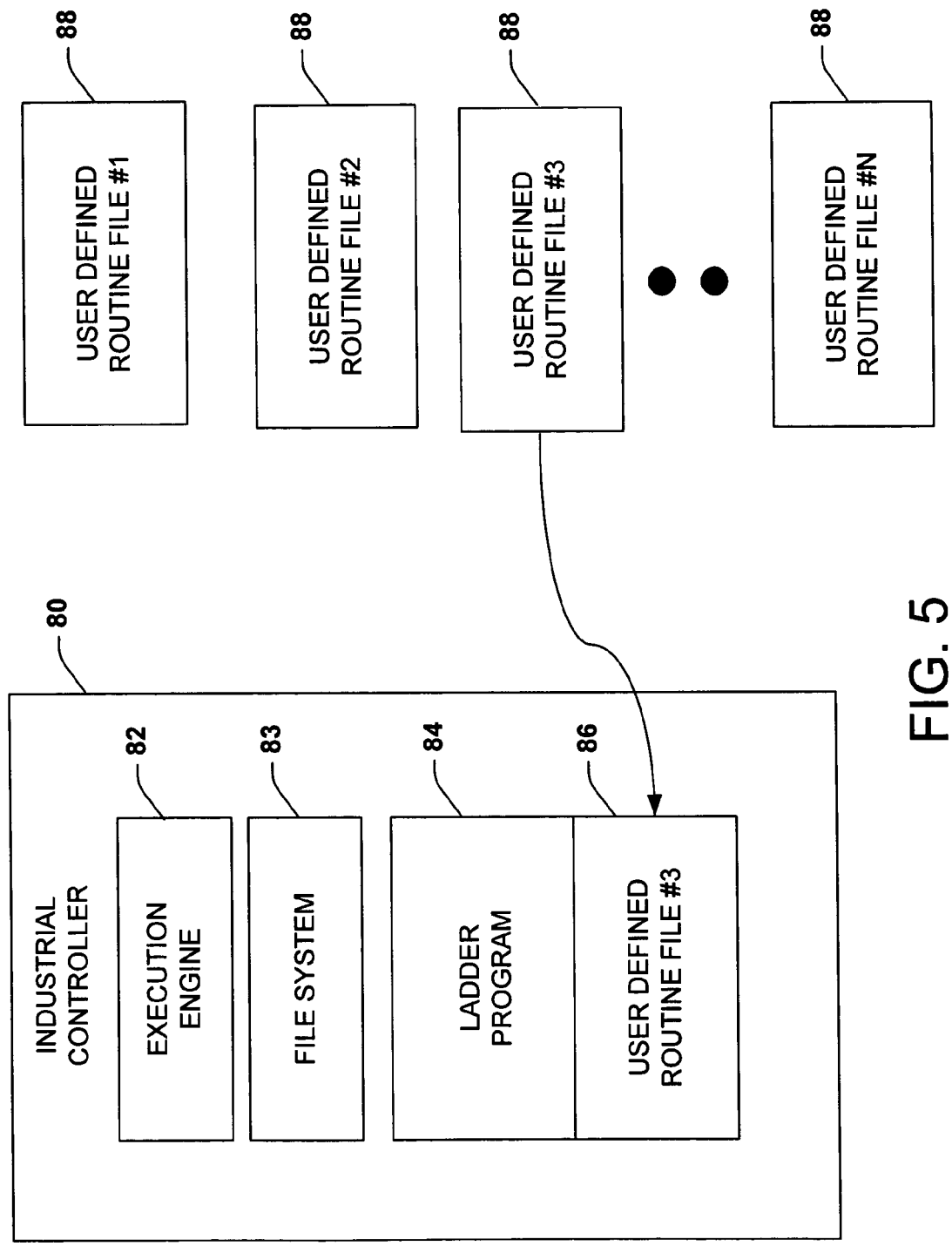
FIG. 5 illustrates a block diagram of an industrial controller loading a user defined routine file in accordance with one aspect of the present invention.

FIG. 5 illustrates an industrial controller including an execution engine 82, a ladder program 84 and a user defined file 86. Upon invocation of an execute command received by the execution engine 82, the execution engine 82 loads the ladder program 84 into random access memory (RAM), while scanning the program for any header commands specifying one or more user defined files 88 to include in the execution of the ladder program 84. The execution engine then loads a copy 86 of the user defined file 86 into the same memory location as the ladder program 84. In the present example, the execution engine selects user defined file #3 from a plurality of user defined files 88 labeled 1-N. Once the user defined files are loaded into the same memory location as the ladder program 84, the ladder program 84 can be executed. It is to be appreciated that more than one user defined file can be included within the ladder program 84.

Figure 6:
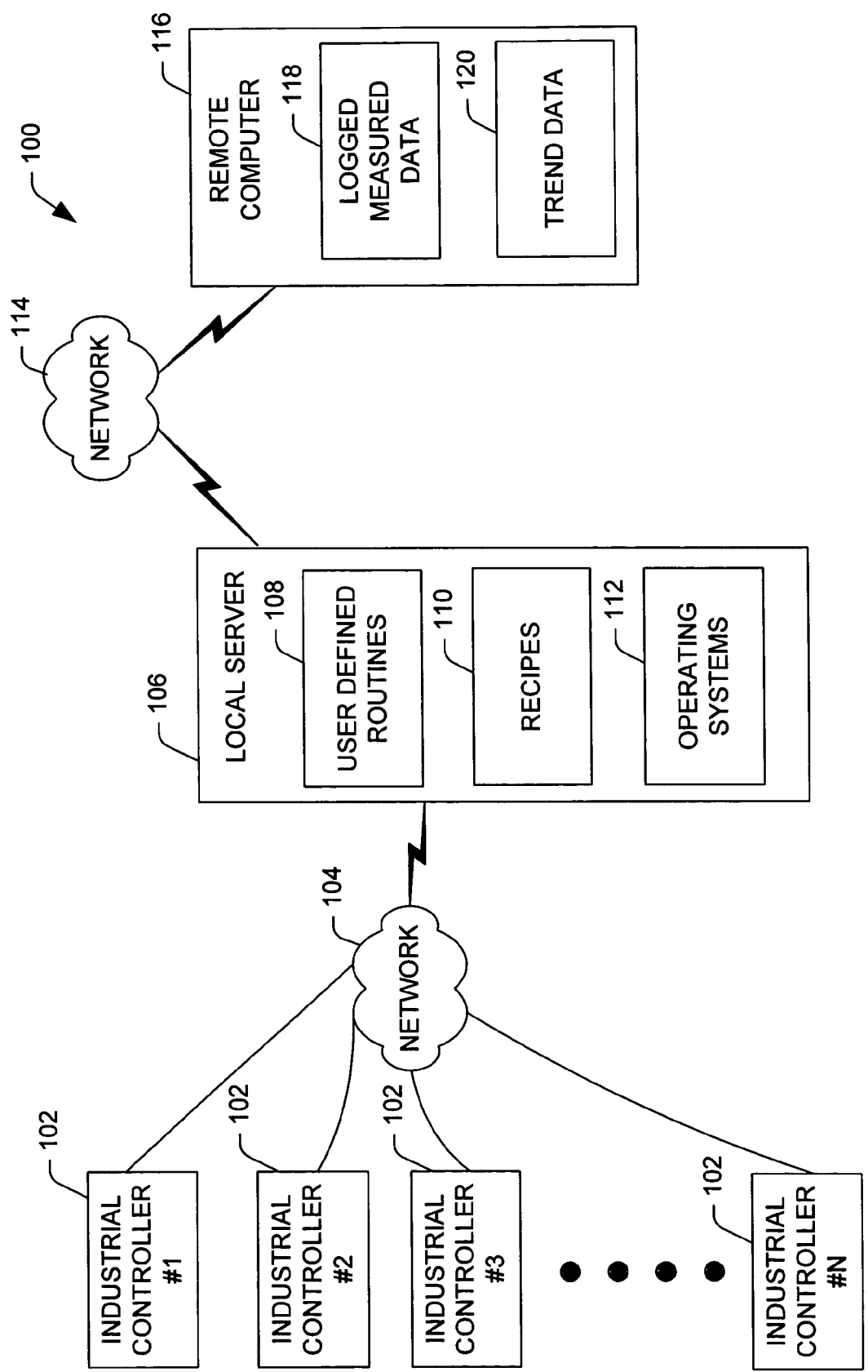
FIG. 6 illustrates a block schematic diagram of an industrial controller interacting with a remote and a local server in accordance with one aspect of the present invention.

FIG. 6 illustrates a system 100 including a plurality of industrial controllers 102 that each implements a file system in accordance with one aspect of the present invention. One or more user defined routine files 108, one or more recipe files 110 and one or more operating system files 112 reside on a local server 106. The local server 106 is coupled to one or more industrial controllers 102 through a first network 104 (e.g., local network, factory network). The first network 104 allows each of the one or more controllers 102 access to the user defined files 108, the recipes 110 and the operating system files 112 through the respective file system residing on the industrial controller 102. Therefore, the size of the memory needed on the industrial controller 102 is reduced by providing the user defined routines 108, the recipe files 110 and the operating system files 112 on a separate memory as opposed to residing on the RAM of the industrial controller 102. Additionally, a single set of user defined files 108, recipe files 110 and operating system files 112 can be employed by each industrial controller 102.

A remote computer 116 is coupled to the local server 106 through a second network 114 (e.g., company intranet, Internet). The remote computer 116 provides a medium in which logged measured data 118 and logged trend data 120 can be stored and accessed for each of the industrial controllers 102 at one or more factory locations. Each of the industrial controllers 102 store and access both measured and trend data utilizing a file system residing on a respective controller 102. Therefore, data can be stored at a remote location automatically instead of in the RAM of the respective controller reducing the size of the memory needed on the industrial controller 102. Also, a single location for all of the data can be provided so that data can be consolidated, aggregated and analyzed for one or more of the industrial controllers 102. It is to be appreciated that the logged measured data 118 and the trend data 120 can reside at the local server 106 with the user defined routine files 108, recipe files 110 and operating system files 112. Alternatively, the user defined routine files 108, recipe files 110 and operating system files 112 can reside on the remote computer 116 with the logged measured data 118 and the trend data 120. In fact any of the user defined routine files 108, recipe files 110, operating system files 112, the logged measured data files 118 and trend data files 120 can reside on any of the RAM of the industrial controller 102, the local server 106 and the remote computer 116 employing the file system in accordance with the present invention.

Figure 7:
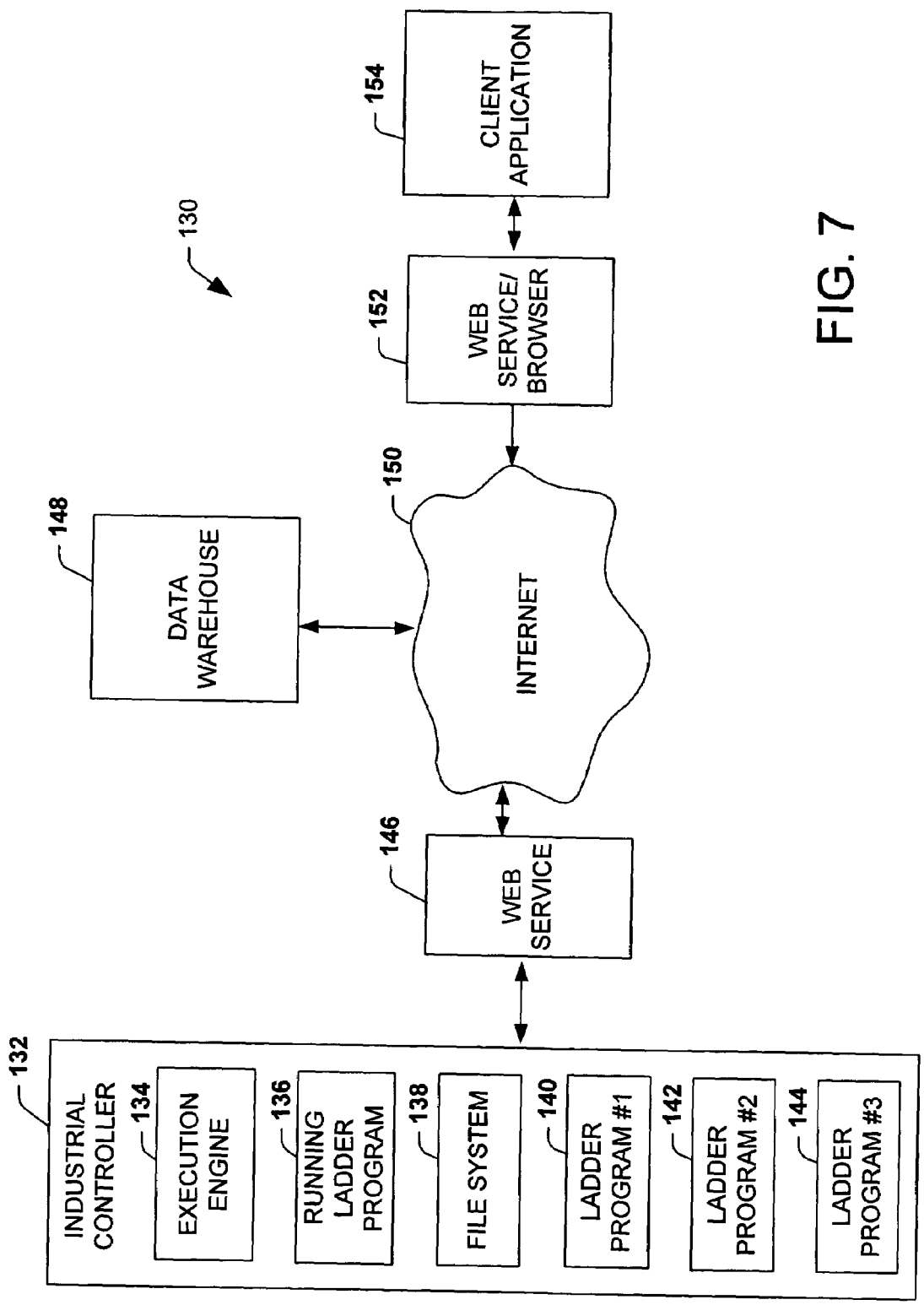
FIG. 7 illustrates a block schematic diagram of a client application accessing the industrial controller via the Internet in accordance with one aspect of the present invention.

FIG. 7 illustrates another example of a possible implementation employing the file system on an industrial controller in accordance with the present invention. A file system 138 resides on an industrial controller 132. The file system 138 is exposed to a web service 146, which allows communication to occur over the Internet 150. The industrial controller 132 includes an execution engine 134 and a running ladder program 136. The industrial controller 132 also includes a first ladder program 140, a second ladder program 142 and a third ladder program 144. A client application 154 is coupled to the Internet 150 via a web service and web browser 152, so that the client application 154 can communicate to the file system 138 over the Internet 150. The client application 154 utilize the file system 138 in conjunction with the execution engine 134 in selecting amongst one of the first ladder program 140, the second ladder program 142 and the third ladder program 144 to provide the running ladder program 136. The client application 154 can communicate a selection command to the file system 138, which informs the execution engine 132 the appropriate ladder program to make the running ladder program 136. The client application 154 can communicate through the Internet 150, for example, using TCP/IP protocol and invoke any or all of the services associated with the file system of the industrial controller 132 anywhere in the world via an Internet connection.

In the example of FIG. 7, the running ladder program 136 includes instructions, employing the file system 138 interpreted by the execution engine 134, for periodically downloading measured and trend data to a third party data warehouse 148 at another location different from the client application 154 and the industrial controller 132. The measured and trend data can then be stored and analyzed off-site, such that third party auditing and/or outsourcing can be provided. The running ladder program 136 can also access data through the data warehouse 148, such as measured data to calculate the trend data. It is to be appreciated that the communication for selecting a running ladder program can be through a local server or personal computer and data logging can performed at a local server or personal computer.

Figure 8:
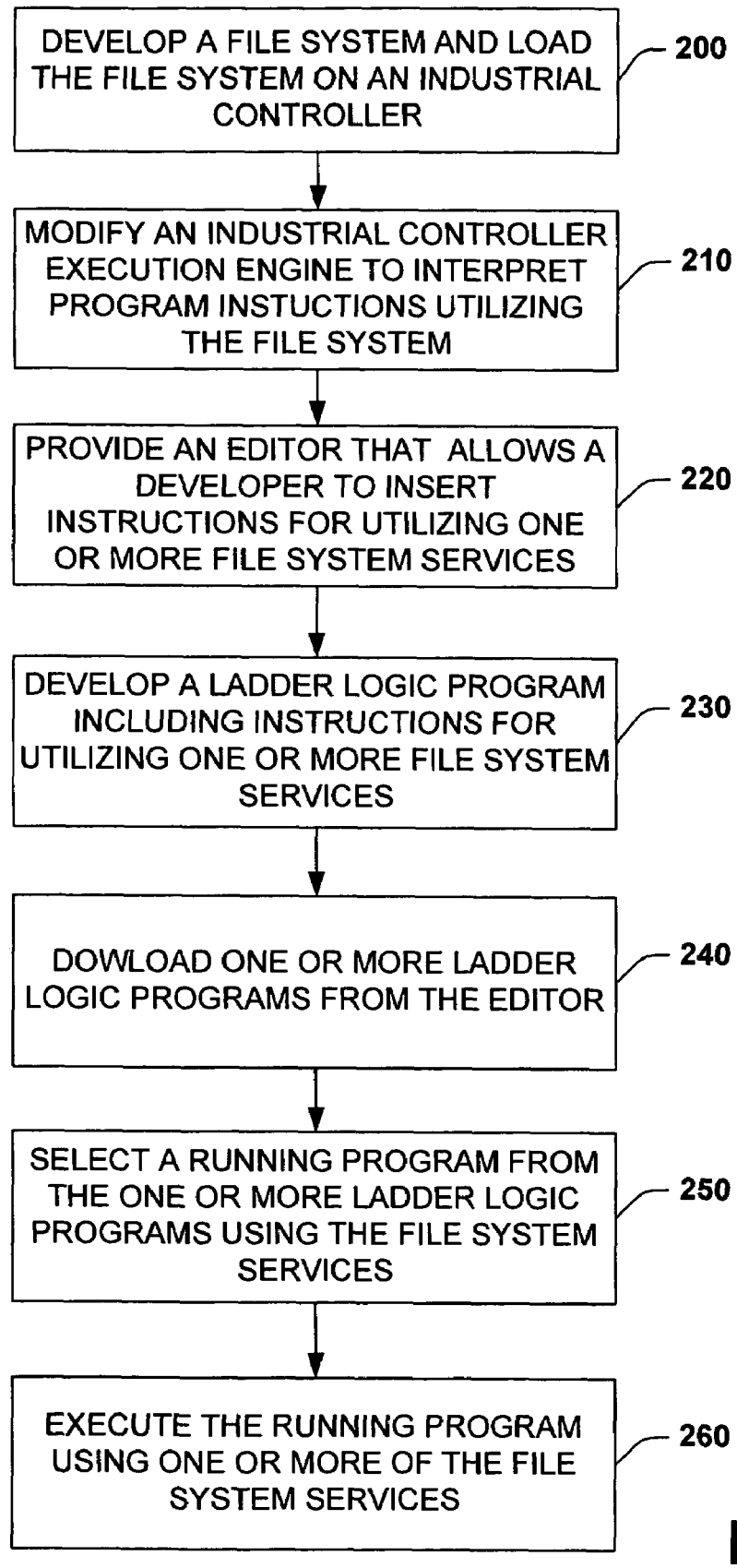
FIG. 8 illustrates a flow diagram of a methodology for providing an industrial controller with the functionality associated with utilizing a file system in accordance with one aspect of the present invention.
Figure 9:
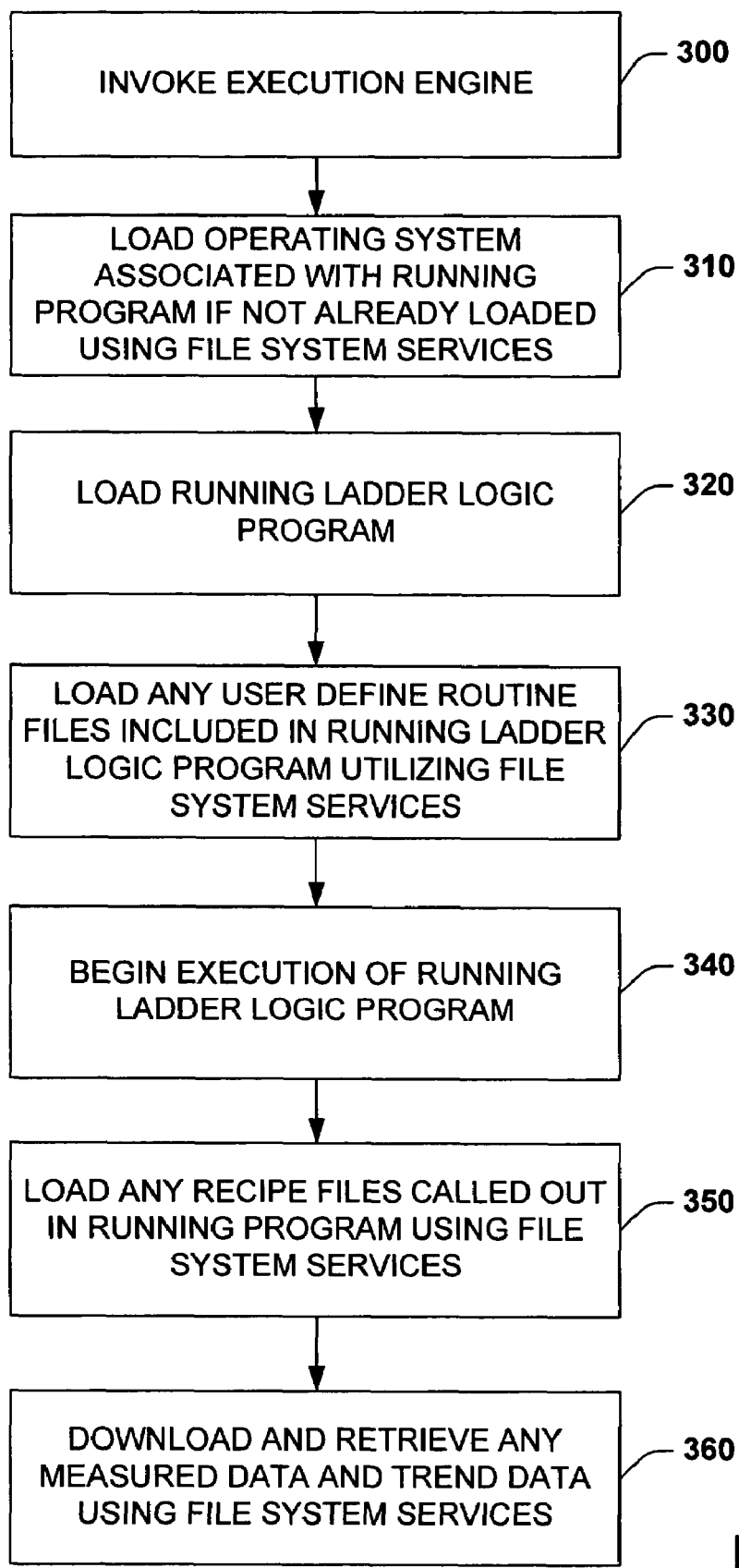
FIG. 9 illustrates a flow diagram of a methodology for executing an industrial control program utilizing a file system in accordance with one aspect of the present invention.
Figure 1:
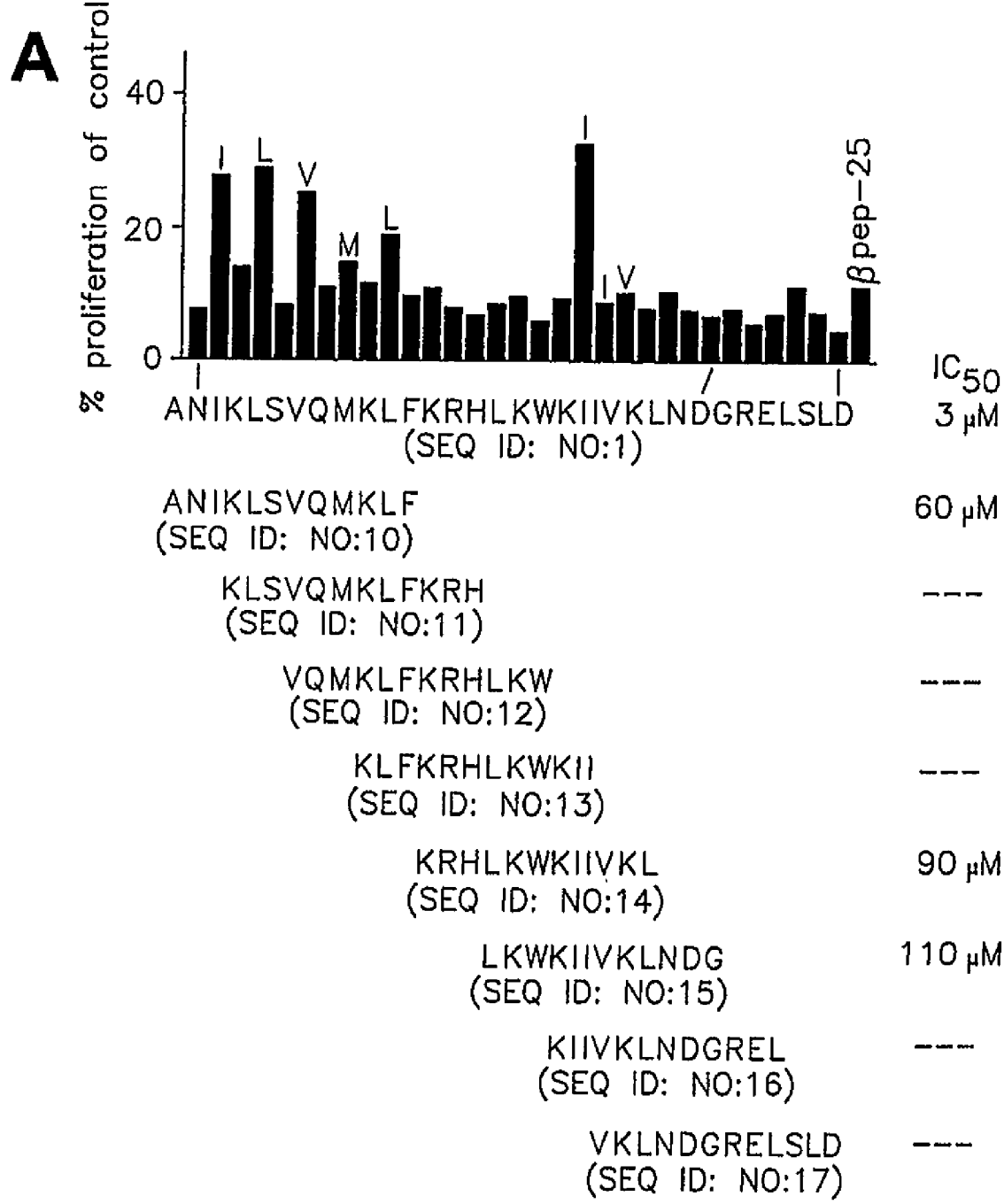
Figure 1:
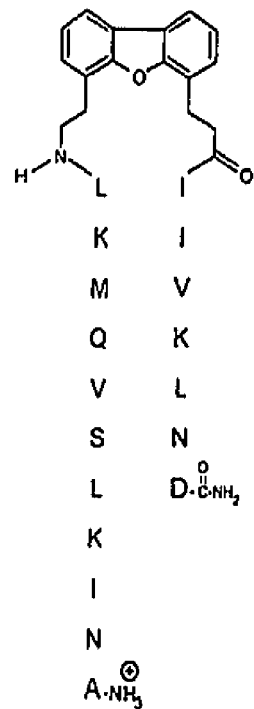
Figure 2:
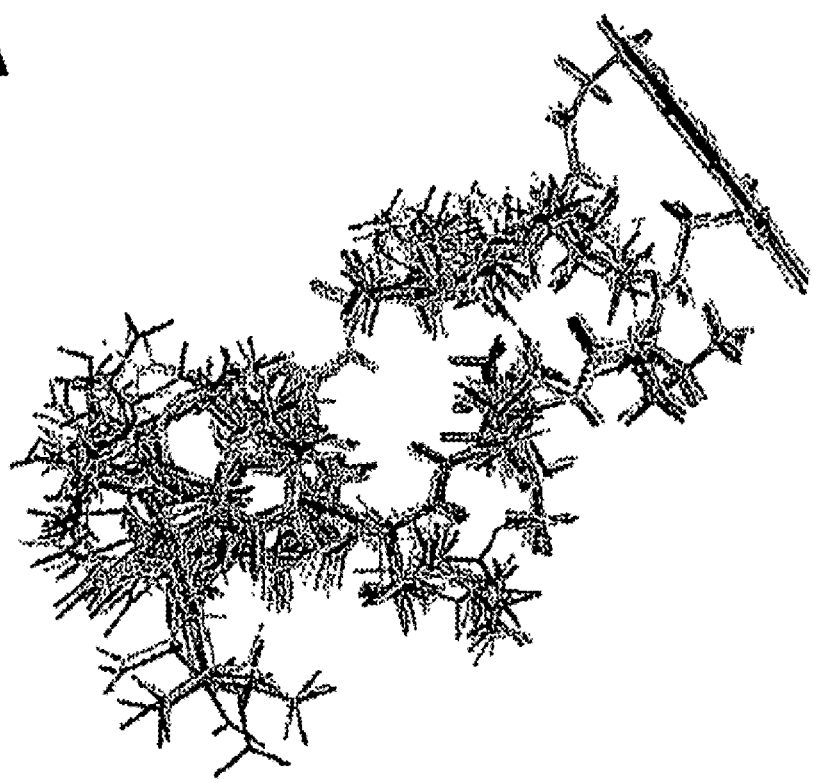
Figure 2:
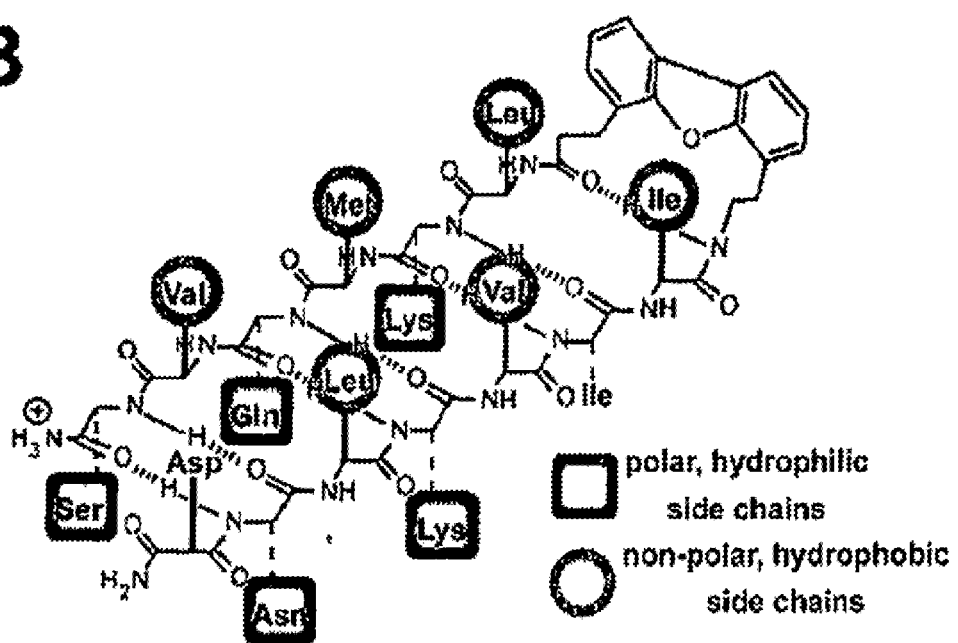
Figure 3:
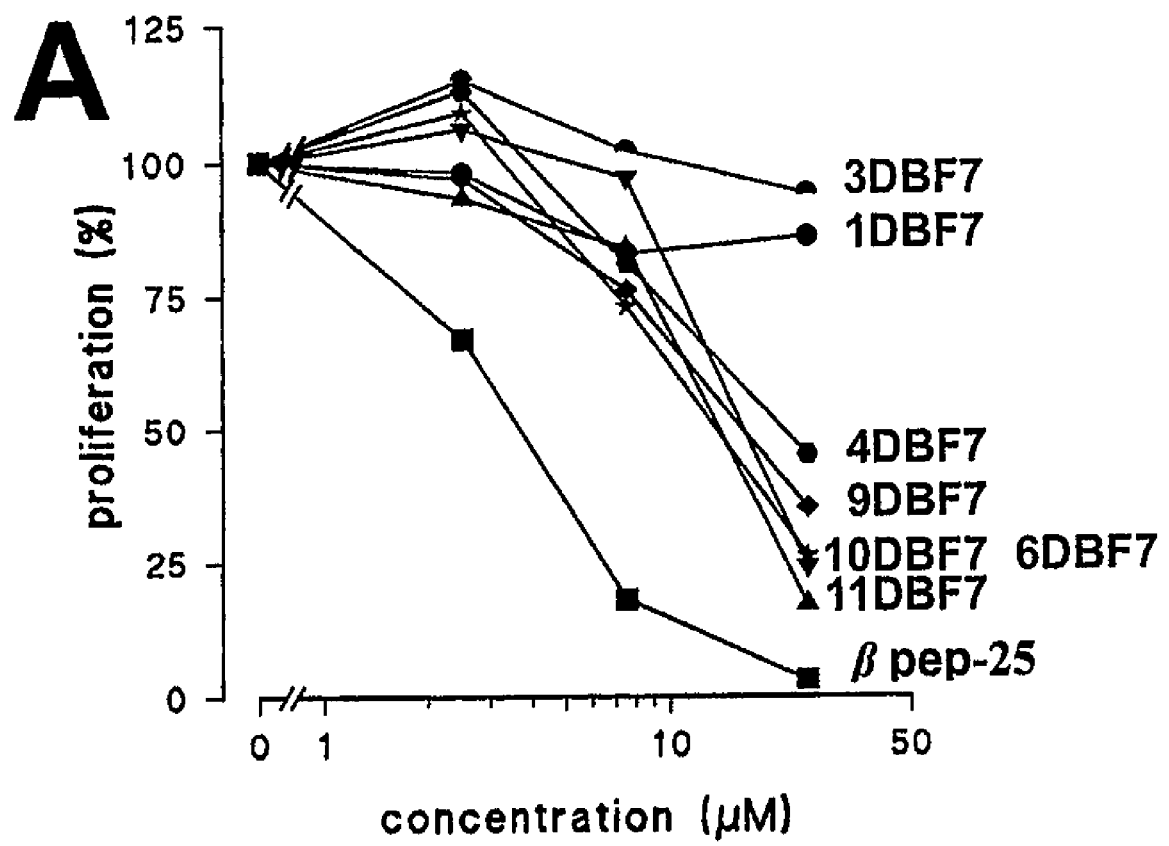
Figure 4:
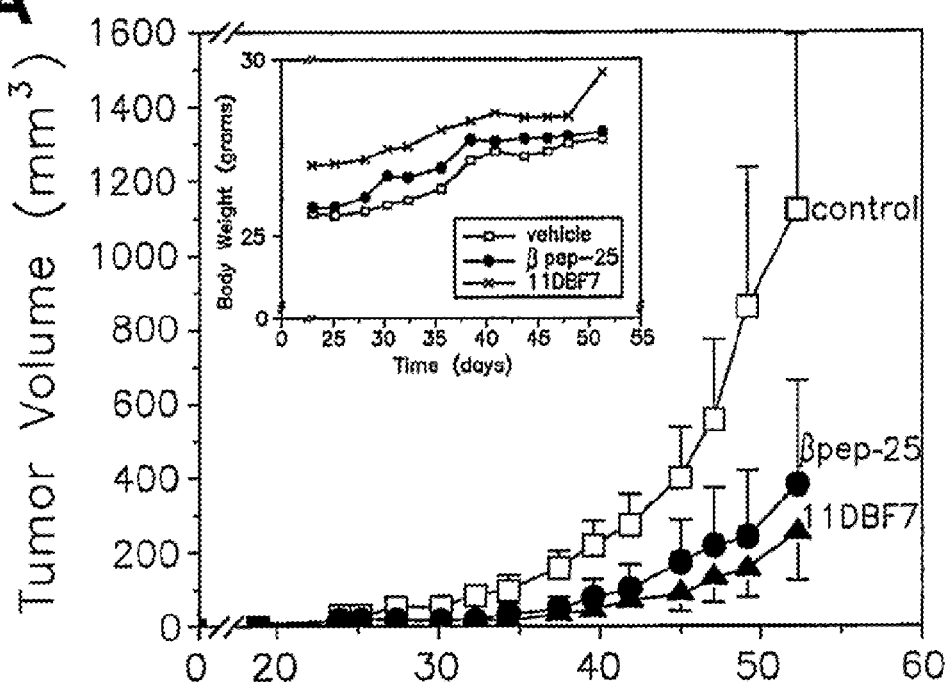
Figure 4:
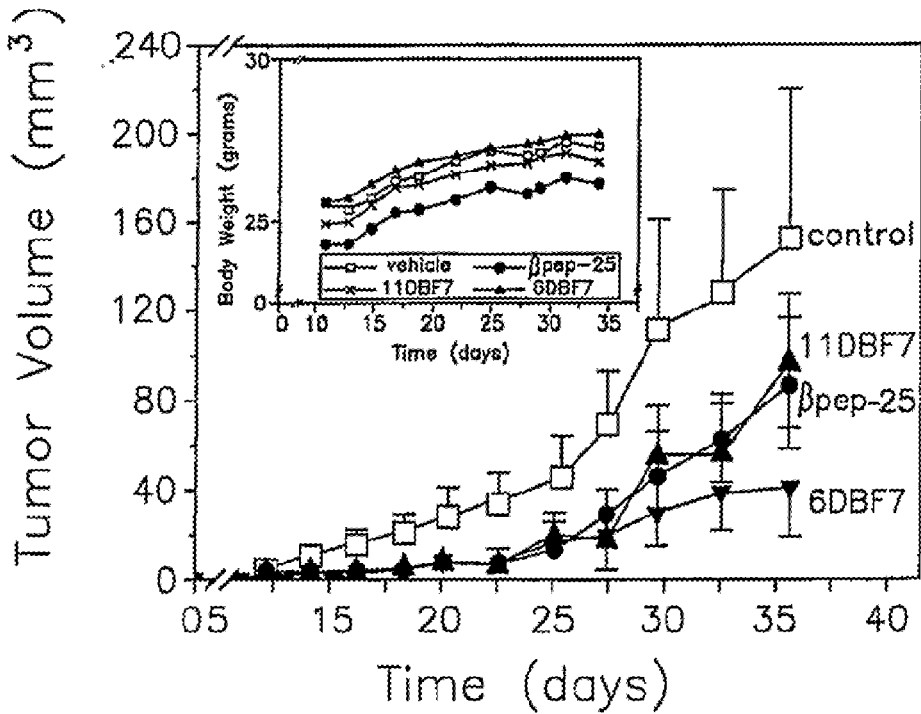

In view of the foregoing structural and functional features described above, a methodology in accordance with various aspects of the present invention will be better appreciated with reference to FIGS. 8–9. While, for purposes of simplicity of explanation, the methodologies of FIGS. 8–9 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 8 illustrates one particular methodology for providing an industrial controller with the functionality associated with utilizing a file system in accordance with one particular aspect of the present invention. The methodology begins at 200 with the development of a file system adapted to operate on an industrial controller and the loading of the file system onto the industrial controller. An industrial controller execution engine is then modified or developed to interpret program instructions that utilize services of the file system at 210. A program development editor is then provided that allows a developer to insert instructions for utilizing one or more file system services at 220. At 230, a ladder logic program is developed including instructions for utilizing one or more file system services. At 240, one or more ladder logic programs are downloaded to the industrial controller from the editor. At 250, a running program is selected from the one or more ladder logic files having one or more instruction utilizing the file system services. The running program is then executed at 260 using one or more of the file system services.

FIG. 9 illustrates one particular methodology for executing an industrial control program utilizing a file system in accordance with one particular aspect of the present invention. The methodology begins at 300 with invocation of an execution engine. At 310, an operating system is loaded associated with the selected running program if the appropriate operating system is not loaded using the file system services. At 320, the running ladder logic program is loaded. At 330, any user defined routine files included in the running ladder logic program file are loaded utilizing the file system services. At 340, execution of the running ladder logic program begins. Any recipe files called out in the running ladder logic program are loaded by using the file system services at 350. At 360, any measured data and trend data called out in the running ladder logic program is downloaded or uploaded using the file system services.

The present invention has been illustrated with respect to a programming methodology and/or industrial controller architecture and a particular example, however, it is to be appreciated that various programming methodology and/or controller architectures suitable for carrying out the present invention may be employed and are intended to fall within the scope of the hereto appended claims.

The invention has been described with reference to various aspects of the present invention. Obviously, modifications and alterations will occur to others upon reading and understanding the foregone detailed description. It is intended that the invention be construed as including all such modifications alterations, and equivalents thereof.

What is claimed is:

1. An editor for developing ladder logic programs that control operation of an industrial controller system, the editor comprising:
    a first instruction that employs a file system that resides on an industrial controller to log data to a file containing ladder logic instructions;
    a second instruction that employs the file system to retrieve the data from the file containing ladder logic instructions; and
    an implementation for converting the ladder logic instructions into instructions understandable and executable by an execution engine in the industrial controller.

2. The editor of claim 1, wherein the data logged to the file and retrieved from the file is measured data.

3. The editor of claim 1, wherein the data logged to the file and retrieved from the file is trend data.

4. The editor of claim 1, wherein the data retrieved from the file is a recipe file.

5. The editor of claim 1, wherein the data retrieved from the file is a user defined routine file.

6. The editor of claim 5, the user defined routine file includes an operating system file selected from amongst a plurality of operating system files.

7. The editor of claim 6, an operating system file corresponding to development of the ladder logic instructions is saved along wit the ladder logic instructions and loaded onto the industrial controller to assure the execution engine and the operating system of the industrial controller system are compatible.

8. The editor of claim 1, further comprising a plurality of additional instructions that facilitate utilizing file system services of the file system.

9. The editor of claim 1, further comprising a ladder data record instruction inserted into a ladder logic program for opening a connection to a target storage file manager object, and for filing and appending a specified data record to data already in the file.

10. The editor of claim 9, wherein variables associated with the record instruction include: a pointer to the data to send; a data size; a path to one of a plurality of file manager objects; a selection for one of the file manager objects; and a specific file to append to a specified data record.

11. The editor of claim 1, further comprising a padder data load instruction inserted into a ladder logic program for opening a connection to a target storage file manager object, and for filing and loading a specified data record to a specified location.

12. The editor of claim 11, wherein variables associated with the record instruction include: a pointer to the location to fill; a data size; a path to one of a plurality of file manager objects; and a selection for one of the file manager objects; and a specific file containing a specified data record.

13. A method for developing ladder logic programs that control operation of an industrial controller system, the method comprising:
    employing a file system that resides on an industrial controller to log data to a file containing ladder logic instructions;
    employing the file system to retrieve the data from the file containing ladder logic instructions; and
    converting the ladder logic instructions into instructions understandable and executable by an execution engine in the industrial controller.

14. The method of claim 13, further comprising inserting a ladder data record instruction into a ladder logic program for opening a connection to a target storage file manager object, and filing and appending a specified data record to data already in the file.

15. The method of claim 13, further comprising inserting a ladder data load instruction into a ladder logic program for opening a connection to a target storage file manager object, and filing and loading a specified data record to a specified location.

16. An implementation for developing ladder logic programs that control operation of an industrial controller system, the implementation comprising:
    means for employing a file system that resides on an industrial controller to log data to a file containing ladder logic instructions;
    means for employing the file system to retrieve the data from the file containing ladder logic instructions; and
    means for converting the ladder logic instructions into instructions understandable and executable by an execution engine in the industrial controller.

17. The implementation of claim 16, the data pogged to the file and retrieved from the file is one of measured data and trend data.

18. The implementation of claim 16, wherein the data retrieved from the file is one of a recipe file and a user defined routine file.

19. The implementation of claim 16, further comprising means for inserting a ladder data record instruction into a ladder logic program for opening a connection to a target storage file manager object, and for one of: filing and appending a specified data record to data already in the file; and filing and loading a specified data record to a specified location.

20. The implementation of claim 19, wherein variables associated with the record instruction include: a pointer to the data to send; a pointer to the location to fill; a data size; a path to one of a plurality of file manager objects; a selection for one of the file manager objects; a specific file containing a specified data record; and a specific file to append to a specified data record.

* * * * *

UNITED STATES PATENT AND TRADEMARK OFFICE
CERTIFICATE OF CORRECTION

PATENT NO. : 7,065,415 B2
APPLICATION NO. : 10/924230
DATED : June 6, 2006
INVENTOR(S) : Mayo et al.

It is certified that error appears in the above-identified patent and that said Letters Patent is hereby corrected as shown below:

Title page, Item [56], under Other Publications:
Delete "Bakele et al." and insert --Bekele et al.--

Old Drawings
Delete sheets 1-4 of Drawings and insert new sheets 1-5 (attached).

Signed and Sealed this

Second Day of October, 2007

JON W. DUDAS
*Director of the United States Patent and Trademark Office*

UNITED STATES PATENT AND TRADEMARK OFFICE
CERTIFICATE OF CORRECTION

PATENT NO.       : 7,065,415 B2
APPLICATION NO.  : 10/924230
DATED            : June 20, 2006
INVENTOR(S)      : James J. Kay et al.

It is certified that error appears in the above-identified patent and that said Letters Patent is hereby corrected as shown below:

This certificate supersedes Certificate of Correction issued October 2, 2007. The certificate should be vacated since no Certificate of Correction was granted for this patent number.

Signed and Sealed this

Thirtieth Day of October, 2007

JON W. DUDAS
*Director of the United States Patent and Trademark Office*